Feb. 13, 1934.　　　　　　　E. A. FORD　　　　　　1,946,904
COMBINATIONAL INDEX POINT SORTER
Filed April 29, 1927　　　12 Sheets-Sheet 2

Inventor
Eugene A. Ford
By his Attorney
W. M. Wilson

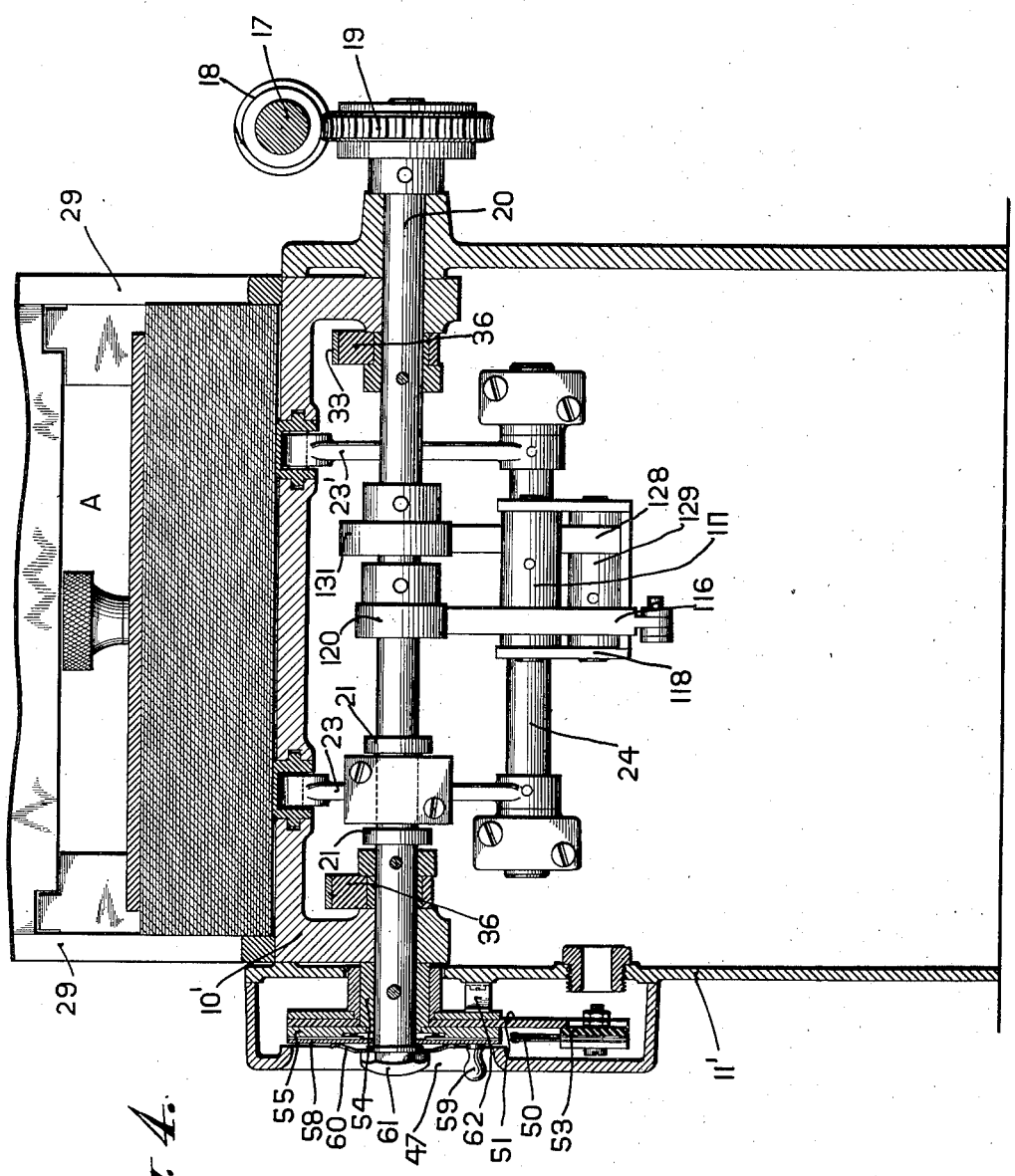

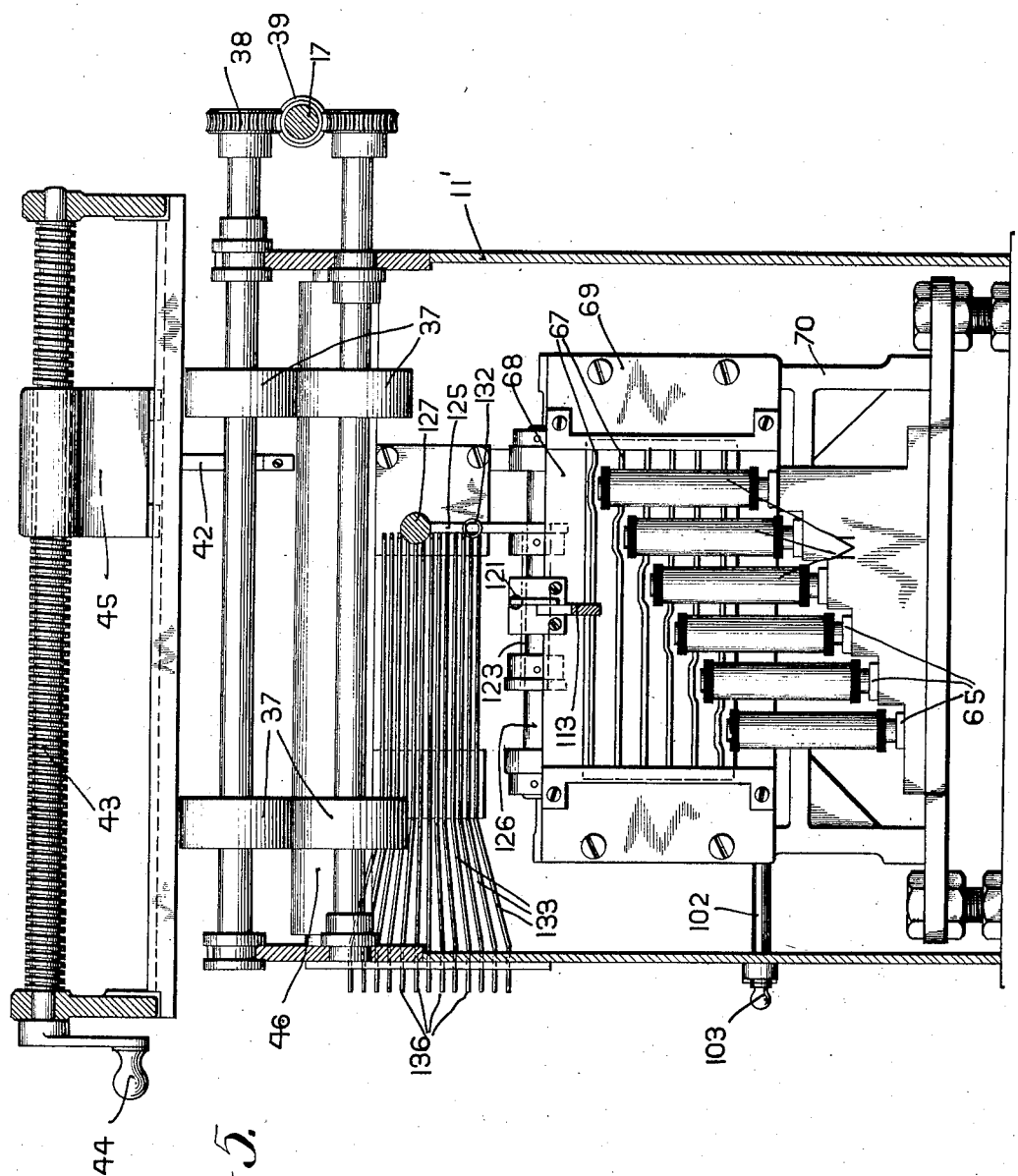

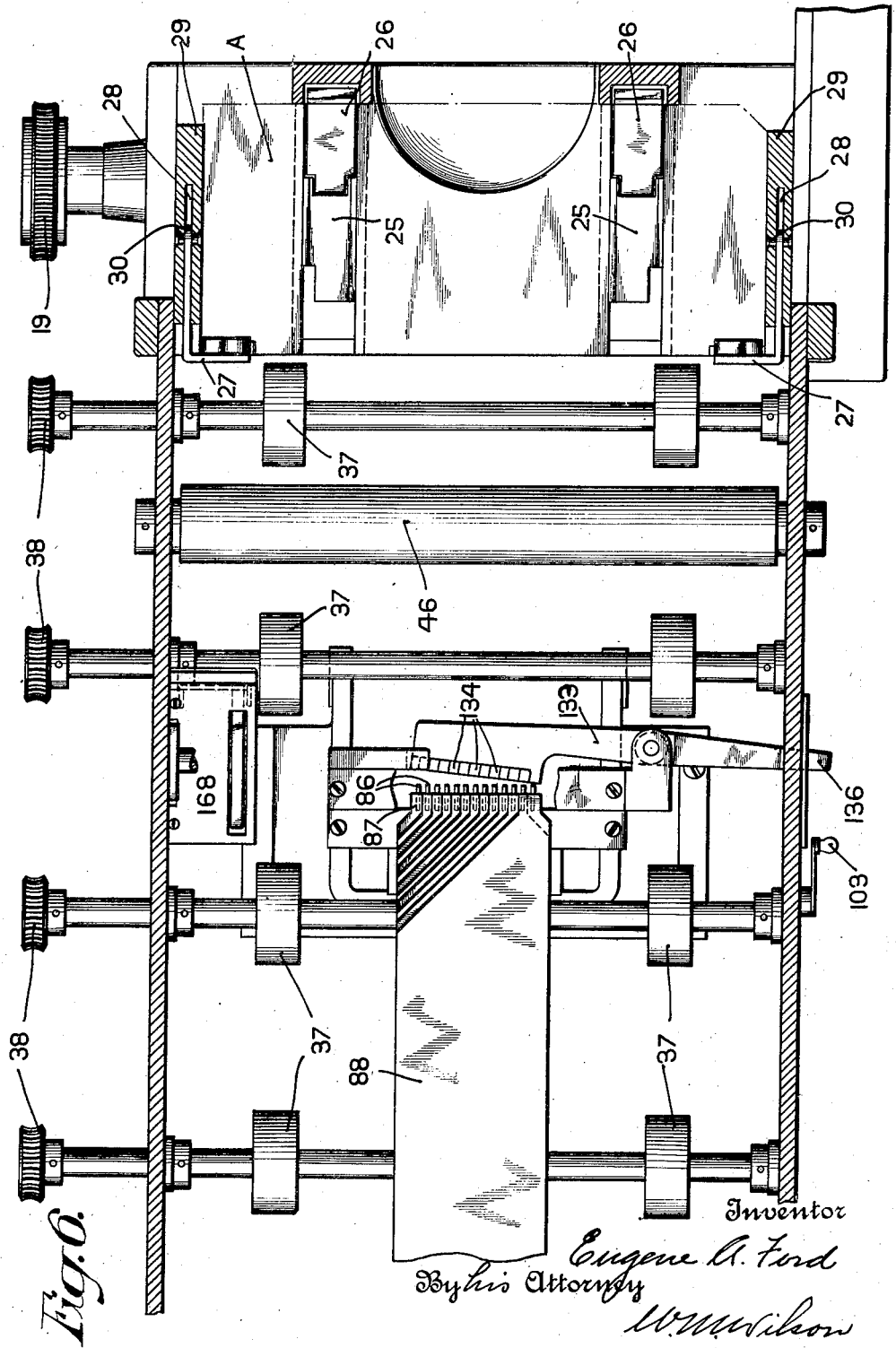

Feb. 13, 1934.　　　　　E. A. FORD　　　　　1,946,904
COMBINATIONAL INDEX POINT SORTER
Filed April 29, 1927　　　12 Sheets-Sheet 7
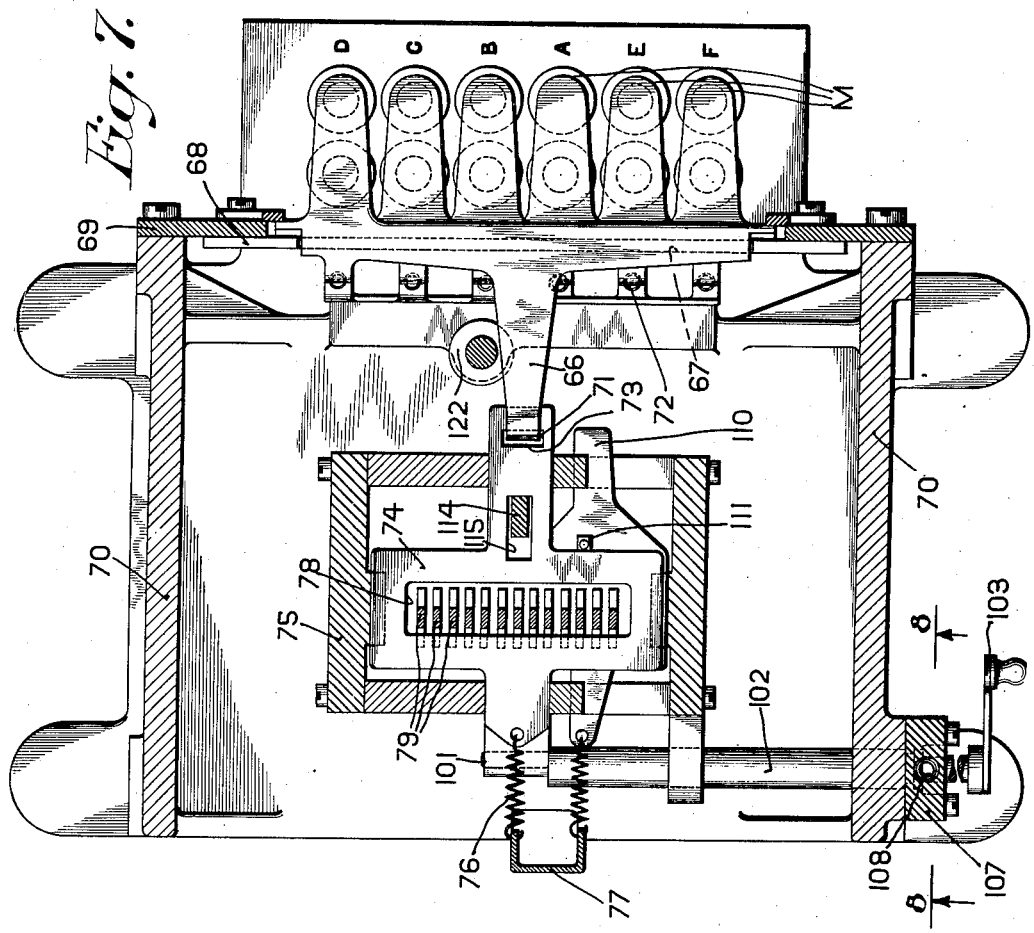
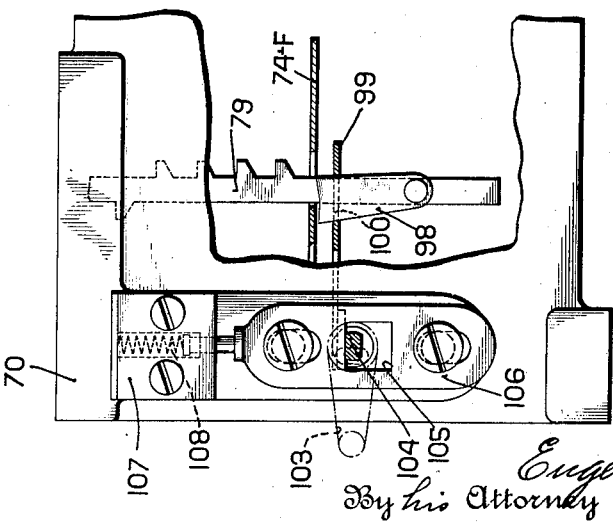
Inventor
Eugene A. Ford
By his Attorney
W. M. Wilson

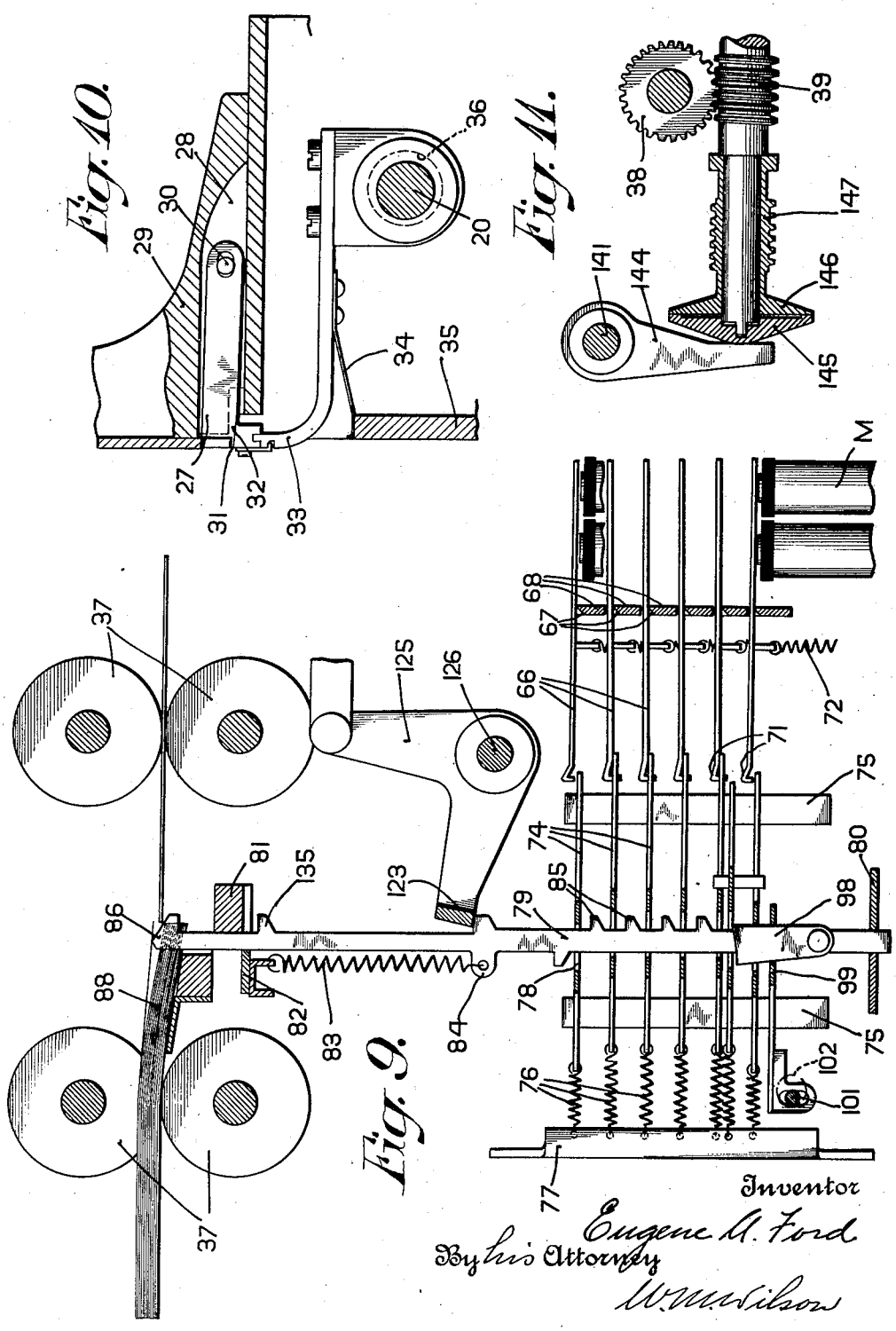

Feb. 13, 1934.  E. A. FORD  1,946,904
COMBINATIONAL INDEX POINT SORTER
Filed April 29, 1927  12 Sheets-Sheet 9

Inventor
Eugene A. Ford
By his Attorney
W. M. Wilson

Feb. 13, 1934.  E. A. FORD  1,946,904
COMBINATIONAL INDEX POINT SORTER
Filed April 29, 1927    12 Sheets-Sheet 10
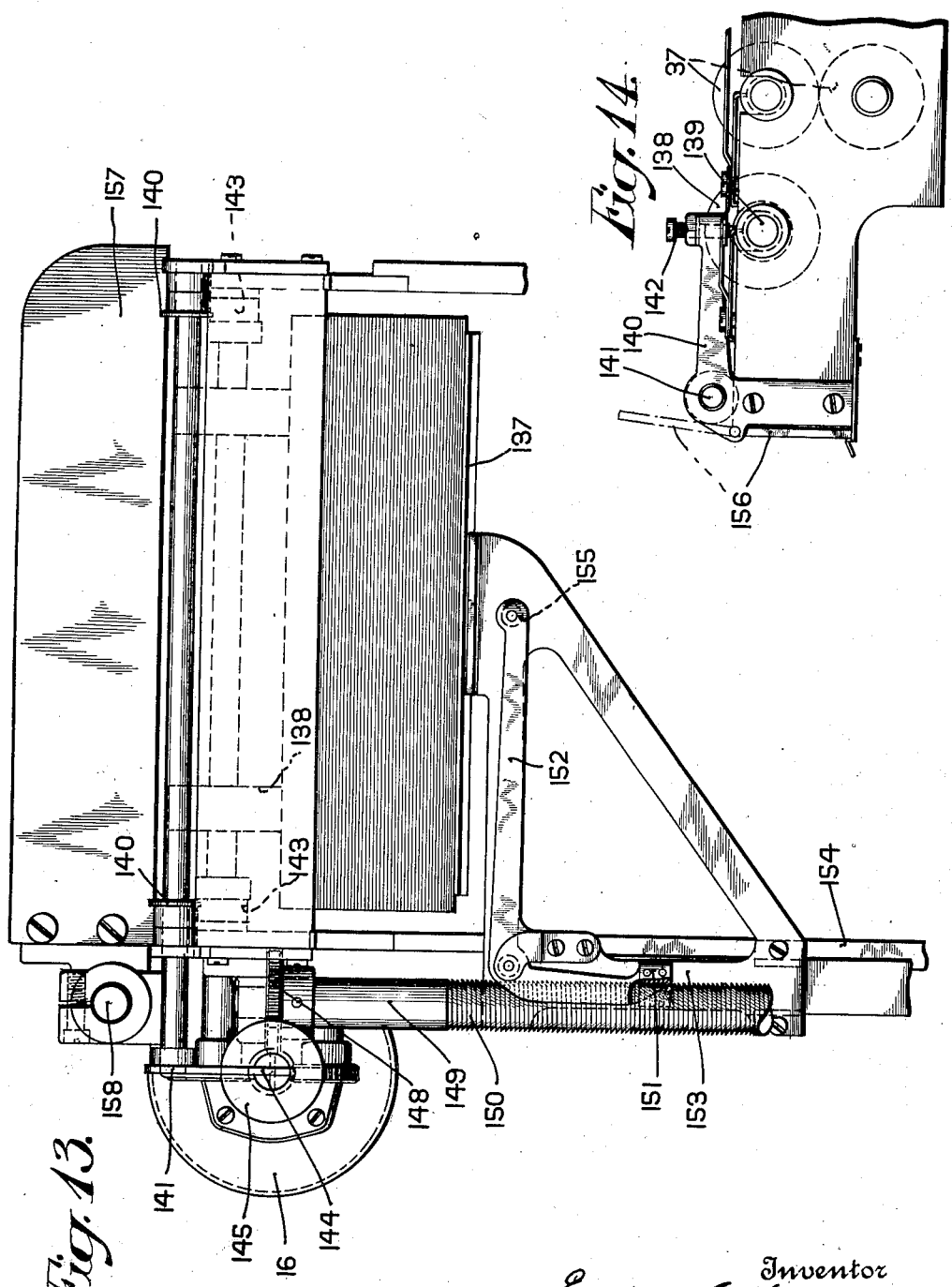

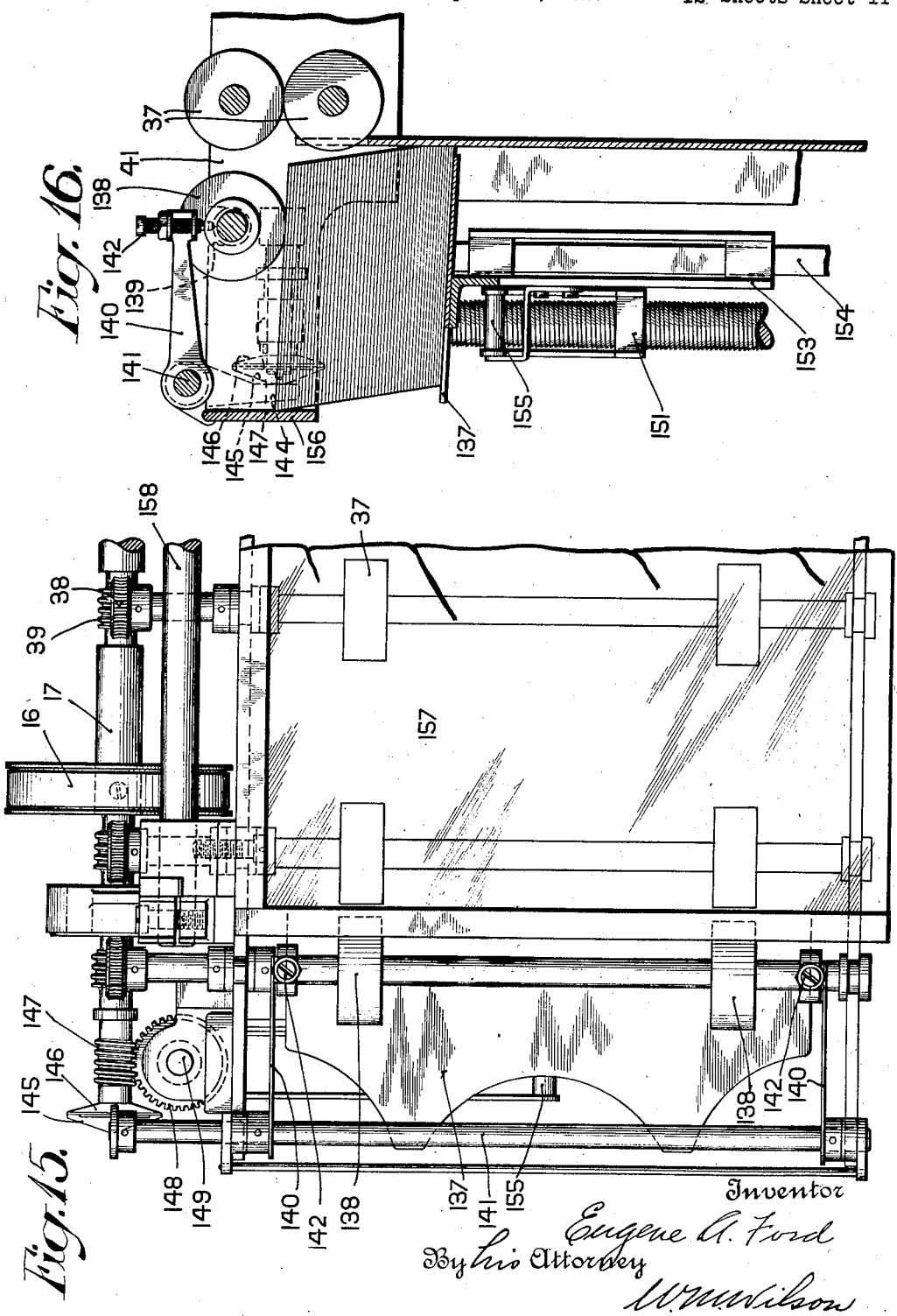

Feb. 13, 1934.                    E. A. FORD                    1,946,904
                    COMBINATIONAL INDEX POINT SORTER
                      Filed April 29, 1927      12 Sheets-Sheet 12
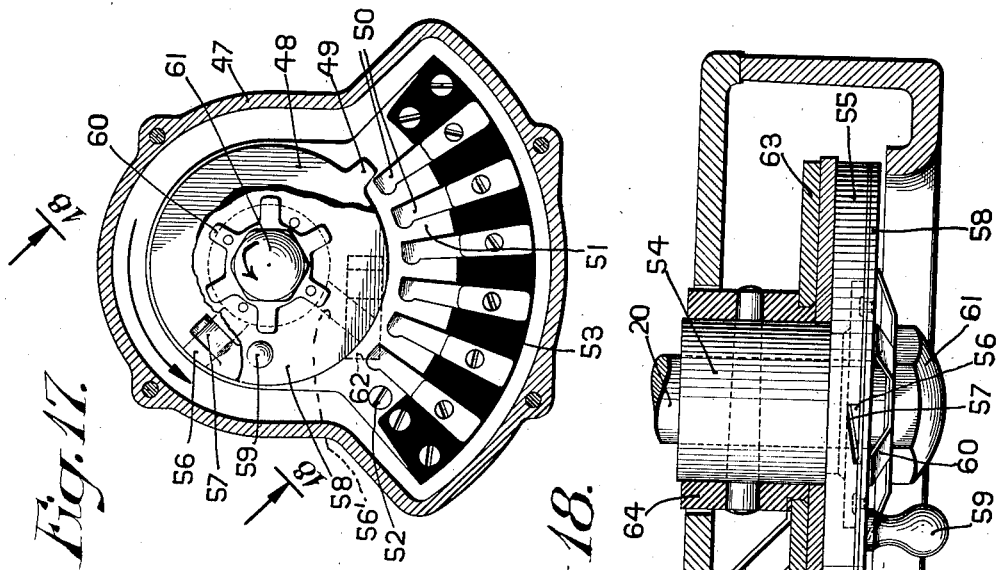
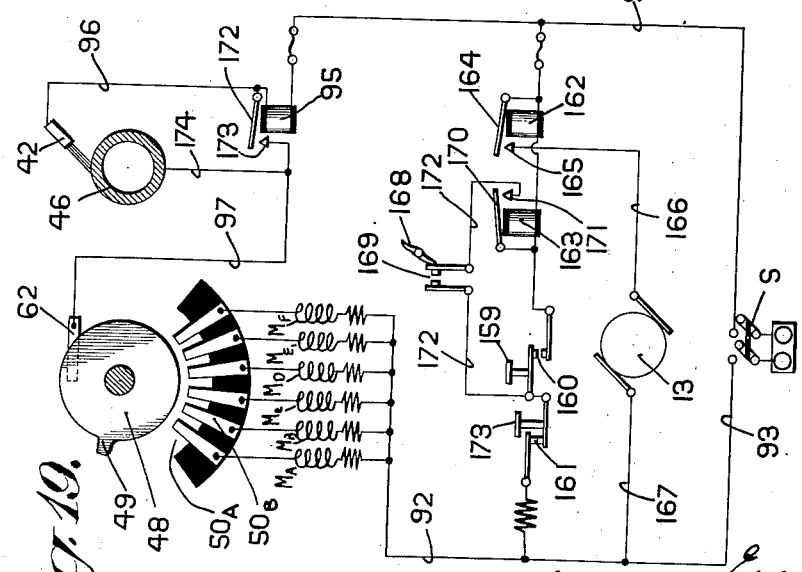

Patented Feb. 13, 1934

1,946,904

UNITED STATES PATENT OFFICE 1,946,904

COMBINATIONAL INDEX POINT SORTER

Eugene A. Ford, Scarsdale, N. Y., assignor, by mesne assignments, to International Business Machines Corporation, New York, N. Y., a corporation of New York Application April 29, 1927. Serial No. 187,511

34 Claims. (Cl. 209—110)

This invention relates to machines especially adapted for sorting record cards in tabulating systems which use combinations of index points to designate characters, as distinguished from the Hollerith type which use a single index point differentially positioned to designate characters.

The object of this invention is broadly to sort records bearing combinations of index points to designate letters, numerals, or other characters.

The objects further are, severally, to analyze all the combinations on the record in a single operation, to provide a single analyzing mechanism for analyzing the record combinations and to provide magnetic means operated from a single analyzing mechanism to sort cards according to the combinations of index points thereon.

This machine also provides novel means for predetermining the index point designations to be sorted.

Further objects will appear in the subsequent portions of the specification.

In the drawings:

Fig. 4 is a section on line 4—4 of Fig. 3,

Fig. 5 is a section on line 5—5 of Fig. 3,

Fig. 6 is a section on line 6—6 of Fig. 3,

Fig. 7 is a section on line 7—7 of Fig. 3,

Fig. 8 is a section on line 8—8 of Fig. 7,

Fig. 9 is a detail of the selecting means for the card,

Fig. 10 is a detail of the movable throat of the card magazine,

Fig. 11 is a detail of the reject mechanism,

Fig. 12 is a perspective view of part of the means for selecting the sorting pocket, Fig. 13 is a front view of the reject mechanism, Fig. 14 is a detail of the reject mechanism, Fig. 15 is a top view of the reject mechanism, Fig. 16 is a central vertical section through the stacking mechanism, Fig. 17 is a front view of the commutator with the front plate of the casing removed, Fig. 18 is a section on line 18—18 of Fig. 17, Fig. 19 is a circuit diagram of the electrical connection of the parts of the machine.

Figure 1:
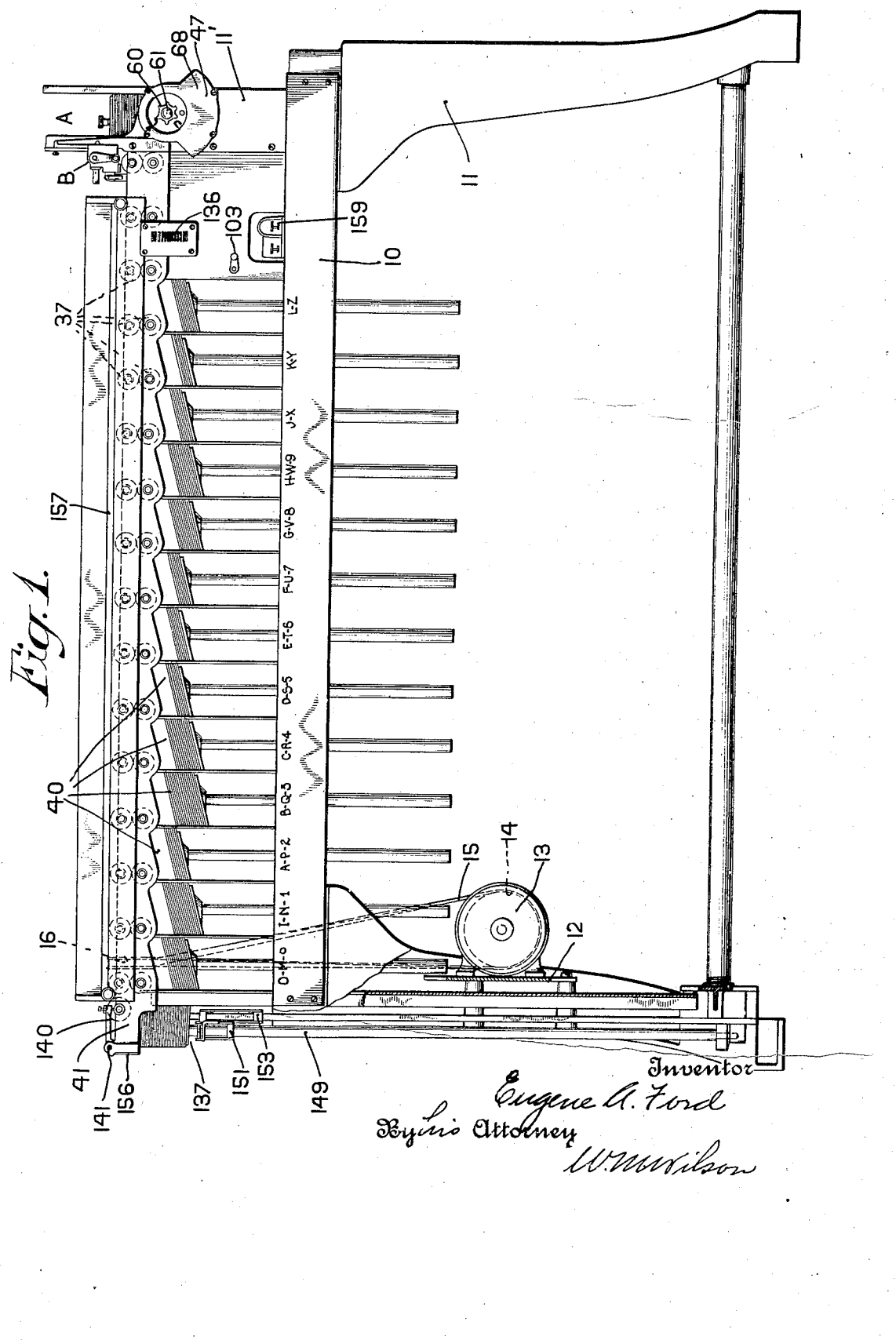
Fig. 1 is a side elevation of the machine.
Figure 3:
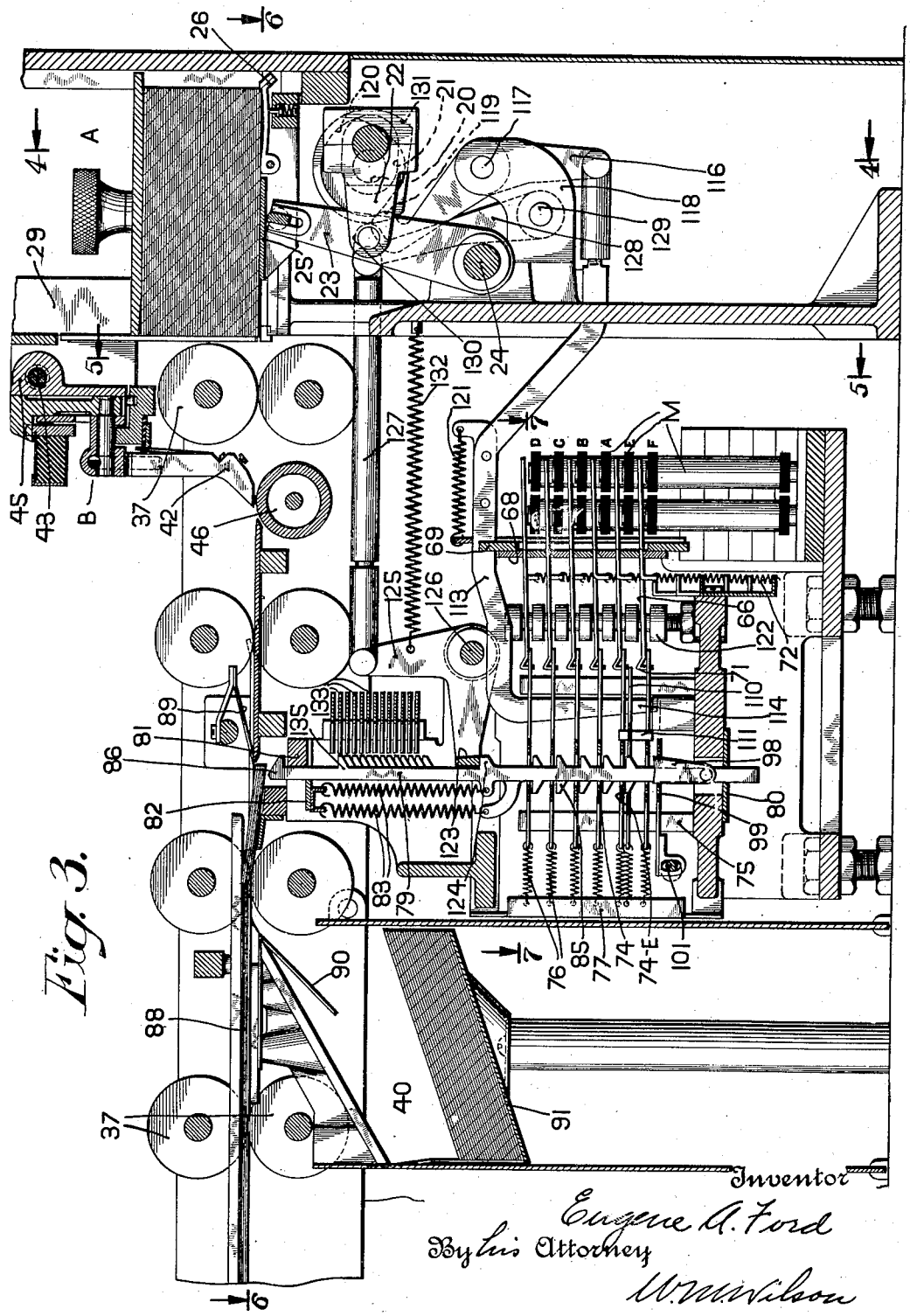
Fig. 3 is a longitudinal vertical section of the machine.
Figure 42:
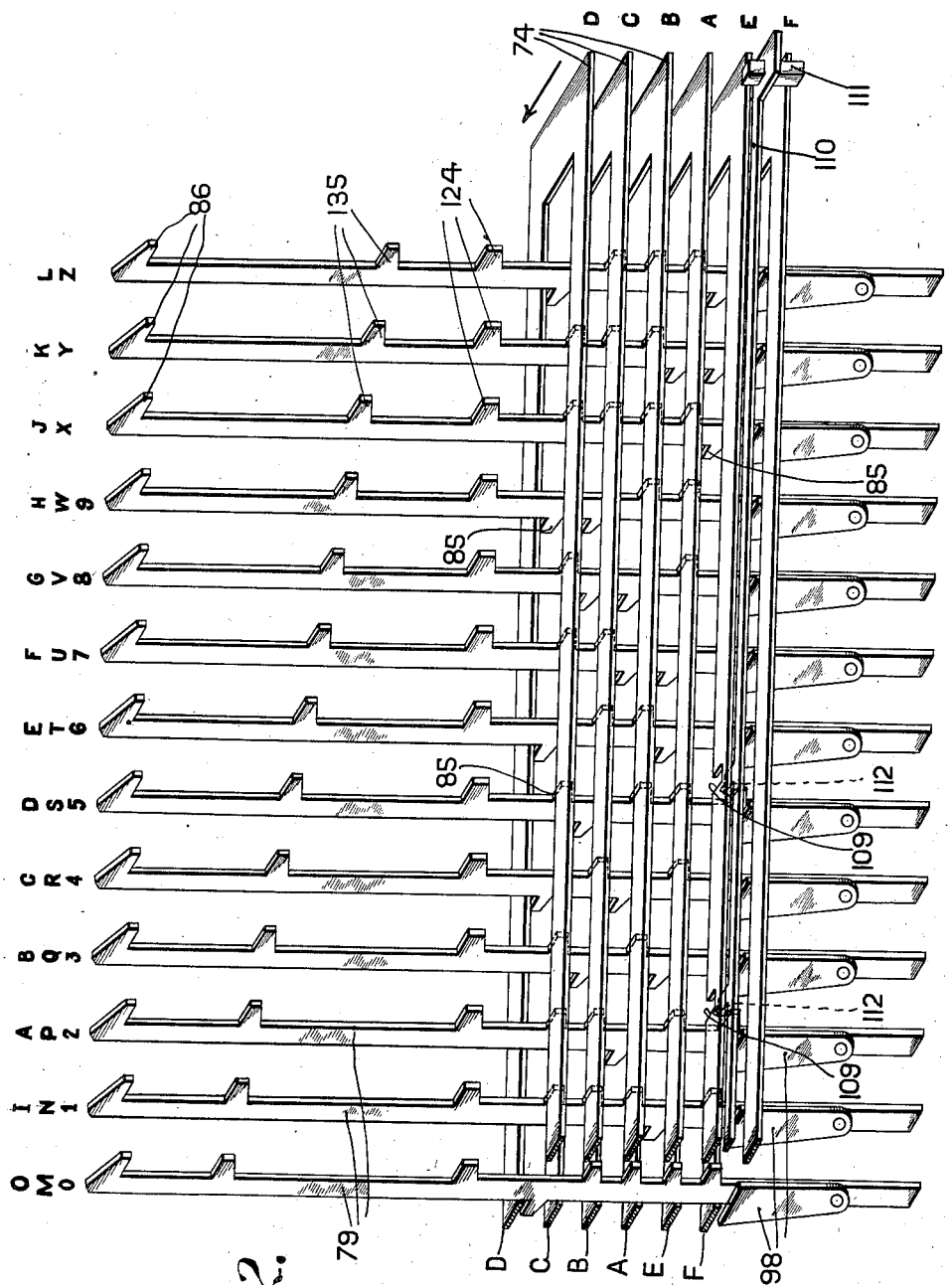

In general the machine operates on the record cards as follows:

Referring to Figs. 1 and 3 the cards are fed one at a time from magazine A through the analyzing mechanism B which is adjusted to read a single selected card column. As the card moves through the analyzing mechanism the analyzing brush senses the perforations in the selected card column successively and in conjunction with a commutator 47 (Fig. 1) completes a circuit which energizes magnets M (Fig. 3). Energization of the magnets M opens selected guides 88 (Fig. 3) which lead the card to one of the sorting pockets 40 (Fig. 3).

*Card.*—The record cards adapted to be sorted by this machine are known in the art as Universal Combinational Cards. The card illustrated in Fig. 2 has an upper and lower field, only one of which is analyzed and sorted at one time. Each field has six rows of forty-five columns. The code used is the combinational hole system wherein the characters are designated by either one, two, three, or more holes in a single column, although it is understood the card may have other systems of combinational hole designations and still be adapted for sorting by this machine. Character 7, for example, is represented by a perforation in the B position and a perforation in the A position and character P by a perforation in the F position and in the B position.

*Card feeding mechanism.*—Referring to Fig. 1, the main frame 10 is mounted on legs 11; to one pair of which is secure a sub-frame 12 carrying a motor 13. A pulley 14 on the motor shaft drives a belt 15 which in turn drives a pulley 16 fixed to the main shaft 17. The main shaft is positioned to one side of the main frame and extends the entire length of the frame. Fixed to the right hand end of the main shaft, as viewed in Fig. 1, is a worm 18 (see Fig. 4) meshing with a worm wheel 19 on a transverse shaft 20. Crank arms 21 on the transverse shaft have a driving connection 22 (Fig. 3) with a picker arm 23 fixed to a shaft 24 which communicates the motion of arm 23 to a second similar picker arm 23'. Attached to each picker arm is a picker plate 25 having a spring-pressed pivoted blade 26 which engages the rear end of the bottom card in the card magazine A to feed the card to the analyzing mechanism B.

There is a tendency for the bottom card, as it is fed, to drag with it by frictional force the card above it. To prevent passage of more than one card at a time the ordinary known card supply magazine is provided with a fixed throat. When the card being fed is slightly warped, the fixed throat is found inadequate because instead of permitting the card to pass, it contacts with the forward edge of the card causing it to buckle and thus mutilating it beyond further use. Means are provided in this machine whereby warped cards may be fed without buckling. This means consists of a pair of movable throats 27 (Figs. 6 and 10) slidably guided for horizontal motion in apertures 28 in the side plates 29 of the card magazine on pins 30. There is sufficient clearance in the apertures to allow the throats to oscillate to a slight extent. Each throat is provided with an opening 31 wide enough to permit passage of one card, but too narrow to permit passage of more than one card at a time. Below opening 31 the throat is provided with an inclined edge 32 on which rests the stack of cards. An arm 33 fixed to the throat is provided with a spring 34 resting on the frame plate 35 of the magazine. Spring 34 urges the inclined edge 32 against the bottom of the lowest card of the stack. As this card is advanced by the picker it rides up on the incline 32 which leads it to the opening 31. Even though the card may be warped, its forward end will rest on the inclined edge 32, raised to contact the card by pressure of spring 34, so that the inclined edge will properly guide the forward end of the card into the opening 31 and permit its unobstructed passage therethrough. In its advance the card may cause to move with it by frictional contact the card or cards above it. The latter card or cards will advance until they strike the portion of the guard above the opening 31. Should they be permitted to remain in this position the picker blades will invariably, on their next feeding movement, engage the bottom one of those cards of which have remained stationary in the magazine and thus has its rear end in the path of the picker blade which would result in its being fed by the picker interfering with the proper operation of the machine for if this card were advanced it would obviously contact the front plate of the magazine frame and buckle. To avoid this difficulty the throat 27 is given a slight horizontal reciprocatory motion in the aperture 28, the purpose of which is to move to the rear of the machine those cards which have been frictionally and hence undesirably advanced by the previous feed of the bottom card. This reciprocatory motion is given to the throats from transverse shaft 20 by means of eccentrics 36 thereon connected with the arms 33 of the throats.

As the card issues from the magazine it is gripped by rollers 37 (Figs. 3 and 6) positioned to engage the card at its sides. The rollers are both positively rotated by engagement of worm wheels 38 (Figs. 5 and 6) on each roll shaft with a worm 39 on the main shaft 17. Rollers 37 feed the card through the analyzing mechanism and similar rolls 37 spaced along the length of the machine continue to feed the card to the several sorting pockets 40 and the reject pocket 41.

*Analyzing mechanism*:—The rolls 37 feed the record card to a single analyzing brush 42 (Figs. 3 and 5) which is of the same type ordinarily used in known sorting machines. To adjust the brush to sense the perforations in any desired card column, a screw threaded shaft 43 manually rotated by a handle 44 is threaded into a block 45 to which the analyzing brush is attached. Rotation of the shaft 43 shifts the block laterally of the machine to position the analyzing brush over any desired card column. The analyzing brush forms one of the analyzing contacts, the other consisting of a rotating metal roller 46. As the card moves through the analyzing mechanism the analyzing brush points are prevented by the card surface from engaging roller 46 to close the analyzing contacts, except where a perforation occurs in the card column in which case the brush points make contact through the perforation with roller 46.

So far the mechanism described is broadly similar to the anlyzing mechanism used in ordinary known sorting machines wherein a single analyzing brush sorts the card to a plurality of pockets, and the code used on the card is confined to a single hole system. In order that a single analyzing brush be adapted to sort cards having a combinational hole system of the character described above, novel mechanism has been devised shown in Figs. 4, 17, 18 and 19. This mechanism includes a commutator 47 positioned outside of the main upper frame member 10' and attached to one of the frame legs 11' (Fig. 4). The commutator is provided with a rotating disc 48 formed with a projection 49 which acts as a rotary brush contact cooperating in turn with each of a series of six stationary split contacts 50 located in the same plane as the commutator disc and radially disposed about the disc center. The contacts 50 are supported by a plate 51 attached to the commutator casing by a screw 52 and are insulated from their support by insulating plate 53. The commutator disc is concentric with transverse shaft 20 and is rotated therefrom by the following mechanism: A sleeve 54, (see Figs. 4 and 18), keyed to shaft 20, has a circular plate 55 attached thereto by a shrink fit. Cut in the sleeve plate 55 is a pair of radial notches 56 and 56', (see Fig. 17), an angular distance apart equal to the distance between similar index positions in the upper and lower card field.

Commutator disc 48 which is of thin spring metal has an integral projection 57 punched therefrom so that it is cut away at the sides and at one end leaving the other end integral with the disc. This projection possesses a spring action and extends at an angle from the disc toward the face of sleeve plate 55 and is adapted to spring into either notch 56 or 56' to key plate 55 and the commutator disc together for common rotation. Attached to the disc is a face plate 58 provided with a handle 59. In order to hold disc 48 and plate 55 in close contact and yet permit them to separate to release projection 57 of the disc from either one of notches 56 or 56' of the plate for engagement in the other notch, a spring plate 60 bears against the face plate 58, being adjustably held thereagainst by a nut 61 threaded on the end of transverse shaft 20. The commutator disc may be adjusted (Fig. 17) to coordinate with the analyzing brush to sort either the upper or the lower field of the card. As described above spring leaf 57 of disc 48 may be released from notch 56 or 56' of plate 55 and the commutator disc rotated counterclockwise by means of handle 59 to cause spring leaf to engage in either notch. When the spring leaf engages notch 56 disc 48 is held to rotate with shaft 20 so that the commutator brush 49 in the counterclockwise rotation of the disc engages the first fixed contact 50 when position A of the upper field of the card comes beneath analyzing brush 42. If spring 57 is engaged in notch 56' the brush 49 engages the first contact 50 when position A of the lower card field is under the analyzing brush, the card being positioned in the supply magazine so that its lower field feeds first and reaches the analyzing brushes before the upper field of the card. The commutator disc is grounded by means of a brush 62 fixed to the rear plate of the commutator casing (Figs. 4 and 18), which slidably engages a plate 63 shrunk on a sleeve 64 keyed to shaft 20. Sleeve 64 transmits the ground connection to the sleeve 54 and thence to plate 55 and commutator disc 48.

Each of the six fixed split commutator contacts 50 corresponds to a position A, B, C, etc. on the record card and may be referred to hereinafter as contact 50 A, B, C, etc. Commutator disc 48 is rotated by transverse shaft 20 in synchronism with the passage of the card beneath the analyzing brush, so that when position A of the card is directly beneath the analyzing brush, the commutator brush 49 engages fixed contact 50A; when position B reaches the analyzing brush, commutator brush 49 has rotated to engage fixed contact 50 B, etc. Connected in the same circuilt in series with each of the six contacts 50 is a double coil comb magnet M, (Fig. 3), each comb magnet representing the same position on the record card as the contact 50 with which it is in series. The magnets are mounted side by side on steps 65 (Fig. 5) so that the tops of the magnets are vertically displaced one above the other. The magnets are provided with armatures 66 pivotally mounted in slits 67 (Fig. 5 and Fig. 9) formed in a plate 68 which is fixed to frame member 69 attached to the frame sides 70. The armatures are formed at their free ends with depending hooks 71 which are held seated by means of springs 72 in notches 73 (Fig. 7) of a series of six comb members 74, one comb member being provided for each armature. The comb members are mounted one above the other in alignment with their corresponding armatures for slidable movement in a rectangular fixed frame member 75. The end of the comb member, opposite that containing the notch 73, is connected to a spring 76, attached to the frame bar 77 which tends to move the comb member toward the frame bar 77 and away from the armatures but is prevented from so doing by the engagement of the hook 71 on the armature with notch 73 in the comb. The combs have elongated openings 78 registering with each other through which extend side by side thirteen guide opening pins 79. Each opening pin corresponds to one of the sorting pockets and is marked in Fig. 12 with the letters which are sorted by its action. Any particular pin may be referred to hereinafter as pin A, pin C—R, pin P, etc. The pins are slidably guided at their lower ends in a plate 80 and at their upper ends between bar 81 and plate 82 (see Fig. 9). The latter plate has springs 83 fixed thereto which are respectively connected to projections 84 on each of the guide opening pins 79 and tend to lift the guide opening pins, but are counteracted by engagement of the combs 74 with one or more projections 85 on either side of the pin.

The upper end of the guide-opening pin is inclined toward the card being fed as indicated at 86 (Figs. 3 and 9). Each pin is located directly beneath and a slight distance away from a corresponding one of a series of projections 87, (Fig. 6), formed on the normally closed guide blades 88.

In accordance with the combination of index perforations in a column of the record card, certain of the combs 74 are actuated during one cycle to release one of the pins. As the pin rises, the upper end contacts its corresponding plate projection 87, lifting the guide plate so that the advancing card which is guided onto incline 86 of the pin by means of a guide 89, enters the opening formed by the lifted guide plate and the one beneath it. The series of rolls 37 then feeds the card between the guides until it enters the sorting pocket 40 to which the guides lead. A plate 90 at the mouth of the sorting pocket directs the card as it falls into the pocket so that all the cards will lie in the same way when they stack up on the ordinary yielding base plate 91.

When a perforation occurs in a certain position on the card, analyzing brush contacts 42 and 46 close at the same time that armature brush projection 49 has engaged fixed contact 50 corresponding to the position on the card where the perforation occurs. For example, if a perforation occurs in the A position, contacts 42 and 46 are closed at the same time as armature brush projection 49 has engaged fixed contact 50A. The closing of the analyzing brush contacts and the commutator contacts completes the circuit (Fig. 19) for energizing the corresponding magnet MA which is in series with the closed contact 50A, through lines 92, 93, switch S, line 94, magnet 95, line 96, the analyzing contacts 42 and 46, line 174, line 97, and brush 62.

The energization of magnet 95 results in its armature 172 closing contacts 173 establishing a shunt circuit which short circuits the analyzing contacts. The purpose of this shunt circuit is to prevent arcing of the analyzing brushes when they break which would result in spoilation of the cards by charring along the index perforations. Immediately after the analyzing contacts break, contacts 49—50 open, causing contacts 173 to open and all the spark occurs at contacts 49—50.

As explained above, cards sorted by this machine have a combinational code system to designate the characters, that is, one or more perforations in a column are used to designate a number or a letter or any other character. The passage of the card through the analyzing brushes results in the perforations in the card column successively energizing the magnets M corresponding to the positions of the perforations on the card. By reference to Figs. 2 and 12 in connection with the accompanying explanation, the manner in which a selected guide opening pin is released by the combination of energized magnets, may be understood.

Figure 2:
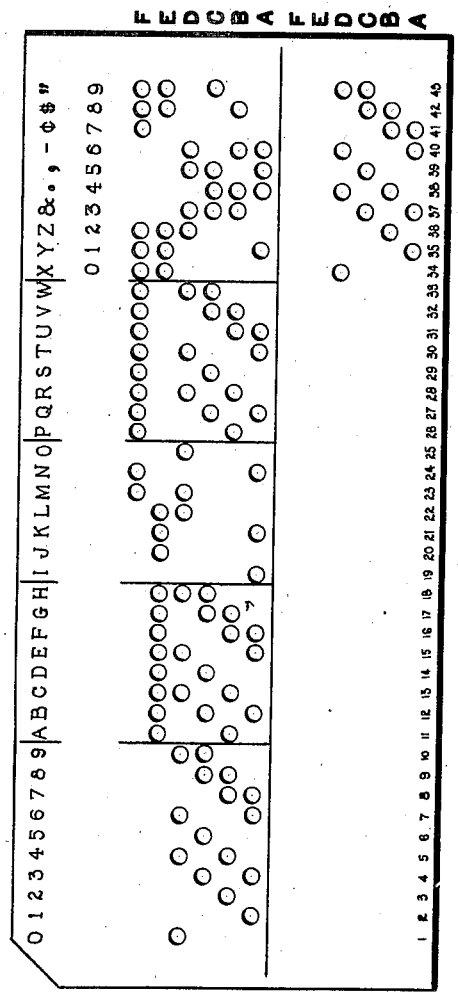
Fig. 2 is an illustration of the type of record card sorted by the machine.

Assuming, for example, that the card column has perforations in C, D and F positions, reference to Fig. 2 indicates that this is the code designation for the letter W. As the card is fed, the perforation in the C position of the card first comes beneath the analyzing brush 42 which makes contact with roll 46 through the perforation simultaneously with commutator contacts 49 and 50 C closing to complete the circuit through magnet MC which is energized to attract its armature and release comb 74C.

Similarly when the perforation in the D position comes beneath the analyzing brushes magnet MD is energized and when F position comes beneath the analyzing brushes magnet MF is energized. As a result combs C, D and F are released by the armatures of the magnets and moved in the direction of the arrow (Fig. 12) by springs 76. Referring to Fig. 12, we note that before release of the combs, they each engage a projection 85 on pin 79—W. When these combs are moved in the direction of the arrow they ride off the projections 85 and as there are no other combs engaging projections 85 on pin 79—W, the pin is free to be lifted by springs 83. As the pin rises, its upper end engages and opens the guide 88 leading to sorting pocket 40 (Fig. 1). It is noted that the difference in designation of the letter W and letter S, is that W has a perforation in the D position as well as in the C and F position, while S has perforations only in the C and F positions. The arrangement of combs and pins must therefore be such as to hold down pin 79—S while permitting pin 79 W to be released. This is accomplished by comb D when W is analyzed, moving in the direction of the arrow to engage a projection 85 on the S pin with which projection it is ordinarily not in contact and thus hold down pin S. It is noted that the numerals as analyzed are sorted into the same pockets as the letters A–L, but no confusion results because in sorting for letters in a certain column, numerals are not likely to occur and numerals and letters are not sorted for in any one run of the cards.

It is not desirable to sort the last seven character designations shown in the card illustration, i. e., &, ., -, ¢, $, ". It may be explained here that there is no occasion to sort for these characters, although they are necessary on the card for other operations as in tabulating and printing machines. The code used for the characters &, ., -, and ¢ is such that actuation of the combs corresponding to the perforations designating the latter characters does not result in releasing any of the pins. For example, the ¢ mark is designated by a perforation in the F position, resulting in the release of comb F. The release of comb F alone releases no pins as can be seen from Fig. 12. Again, taking the character &, its analysis results in releasing combs B, C and D. The action of comb D results in releasing pins M, R, T, W, and Z and in engaging projections 85 on the other pins to hold them down. The effect of the movement of comb C is to release Q, S, V and W, holding the other pins down. The combined effect of the combs C and D, is, therefore, to release only pin W, but this pin is held down by the movement of comb B, therefore, the combined result of the motion of combs B, C and D is to release none of the pins and hence not to sort for "&".

Means have been devised whereby the 13 guide-opening pins, guides, and sorting pockets, provided in this machine, are adapted to sort the entire 26 letters of the alphabet. This means comprises a triangular arm 98 pivoted on each pin, the base of the triangle serving as a stop projection similar to stop projections 85. Comb 74—F coacts with the bases of arms 98 to control the pins 79.

Referring to Fig. 12, arms 98 are there shown positioned to sort for the last thirteen letters of the alphabet M-Z. In order to sort for the first thirteen letters —A to L— the arms 98 are oscillated so as to position their bases on the opposite side of the guide-opening pins, the difference in the two positions of the triangular arms being clear from a comparison of Figs. 3 and 8. In the latter the arms are positioned to sort letters —M to Z— while in the former the arms are positioned to enable sorting of letters A to L. In order to swing the arms from one position to another a single bar 99 slidable in frame 75 (Fig. 3) has an opening 100 (Fig. 8) in which the upper portions of all the triangular arms 98 are positioned. The bar is actuated by an extending pin 101 eccentrically mounted on the end of a shaft 102 operated by a handle 103. The shaft 102 is formed with a narrow rectangular portion 104 (Fig. 8) which is engaged by the upper wall of a recess 105 in a plunger 106 slidably mounted in a plate 107 fixed to frame 70 near the handle 103. A spring 108 urges the upper wall of the recess 105 into engagement with the rectangular portion 104, thus retaining the shaft 102 in either of its two desired positions. When engaged with the side of the rectangular portion, as shown in Fig. 8, the bar 99 holds the stop arms 98 in position for the sorting of the letters M to Z. When the shaft is rotated 180°, the opposite side of the rectangular portion 104 is engaged and the bar 99 is retained in position to hold the arms 98 for sorting A to L.

Referring to Figs. 2 and 12 again, it is noted that the code for letters A and D includes a perforation in the E position. Pins 79—A and 79—D are provided with projections 85 below the E comb. As a result if A or D designations occur on the card, the E comb moving toward these pins would hold them down, by engaging said projections and preventing sorting of letters A and D. As it is desired to sort these letters, the E comb is formed with slots 109 above said projections 85, whereby if letters A or D occur causing actuation of the E comb said projections on pins 79—A or 79—D move through said slots and the E comb has no holding effect on said pins. It is not desired to sort for either the $ designation or the " designation, as previously explained. The $ designation includes the code E and B of the A designation, having in addition a perforation in the F position, and also includes the code of the P character with the addition of an E perforation. The " designation has the same code as the S and D characters with the addition of E and F perforations respectively. It is desired to hold the pins 79 A—P and S—D down when the $ or " characters are under the analyzing brush. For this purpose, a floating comb 110 (Figs. 3 and 12) is positioned between combs E and F. A lug 111 is provided on the floating comb which contacts with combs E and F. In order that the floating comb be moved by its spring 76, both combs E and F must be actuated. Movement of either comb E or F without the other has no effect on comb 110 because its lug 111 is held back by the comb E or F remaining stationary. When the comb 110 is permitted to move toward the pins by movement of both combs E and F, projections 112 on comb 110 move beneath slots 109 of the E comb to engage the stop 85 of pins A—P and D—S located beneath the E comb. Therefore, the analysis of the $ or " characters which results in movement of the E and F combs does not cause actuation of any of the pins, including pins D—S and A—P, due to the intervention of floating comb 110. A bail 113 has a depending arm 114 (Figs. 3 and 7) which extends through holes 115 in the combs 74 and is actuated by lever 116 journalled intermediate its ends on shaft 117 supported in standards 118. The free end of the lever 116 has a nose 119 engaged by a cam 120 (see Fig. 4), on transverse shaft 20 whereby the lever is oscillated against the force of a spring 121 to reciprocate the bail 113 and cause depending portion 114 to move all the combs back to their original position against the action of the springs 76. The depending armature hooks 71 which remain on the surface of the combs after disengaging notches 73, the combs not being moved a distance sufficient to cause the hooks to drop off their surface, thereupon reengage notches 73 in preparation for the next cycle of operations. Threaded nuts 122 (Fig. 3) are provided to minutely adjust the position of the armatures 66.

In order to return to initial positions the guide opening pins which have been released by the combs 74, a bar 123 (Figs. 3 and 5) engages a projection 124 on each pin. The bar 123 is a lateral extension of a bail 125 which is oscillated about shaft 126 by a rod 127 and a link 128 pivoted in the standards 118, on shaft 129. Link 128 has a cam follower 130 engaged by a cam 131 on transverse shaft 20 (Fig. 4). The cam 131 rocks the bell crank 125 against the influence of spring 150

132 thereby once per cycle retracting the pins 79 to their initial position.

When it is not desired to sort for any one or more of the index point designations, manual means are provided to individually hold down the pins 79 corresponding to these designations, and referring to Figs. 3, 5 and 6, these means consist of levers 133 oscillatable in horizontal planes, one above the other. One end of each lever has a projection 134 which cooperates with a ledge 135 on the guide opening pins in approximately the same horizontal plane as the projection. The other end 136 of the lever 133 extends outside of the machine frame, (Figs. 1 and 6) and serves as a handle for shifting the levers into or out of engagement with pin ledges 135. Any lever 133 may be shifted to engage the corresponding ledge 135 when it is not desired to sort for the character corresponding to the particular guide pin held down.

Those cards which are not sorted do not enter any of the sorting pockets 40 and are fed along by rolls 37 to a card stacking device 41 (Figs. 1, 15 and 16). The last pair of rolls 37 feed the card beneath feed rolls 138 located above the stacking plate 137 and mounted in floating bearings 139 (Figs. 14 and 16) open at the top to permit rolls 138 a vertical motion in the bearings. A pair of arms 140 keyed at one end to a shaft 141 have adjustable screws 142 in their other ends bearing on bushings 143 on the shaft of the feed rolls 138. At the end of shaft 141 in line with the main shaft 17, is an arm 144 (Figs. 11, 13, and 16) contacting the inactive face of a clutch disc 145 slidably keyed on shaft 17 for rotation therewith and adapted to engage a clutch disc 146 integral with a worm 147 on shaft 17 which serves to rotate a worm gear 148 on a vertical shaft 149, (Figs. 13 and 15), formed with a threaded portion 150 cooperatively engaged by a nut 151 attached to one end of a bell crank 152. The latter is pivoted intermediate its ends on the frame 153 sliding on frame bar 154 and supporting the stacking plate 137. The free end of the bell crank serves as a handle portion 155, whereby the nut may be disengaged from the threaded portion 150. When a card advances beneath rolls 138 it lifts the rolls thereby moving the arms 140 to actuate shaft 141 and moving arm 144 to press clutches 145 and 146 together causing rotation of worm 147 and worm gear 148. Shaft 149 thereupon rotates and its threaded portion 150 cooperates with nut 151 to move the stacking plate down. As the card stack moves down with the plate, rolls 138 drop in their bearings, arm 144 relieves its pressure from clutch disc 145, and the clutch discs disengage, causing rotation of shaft 149 to cease. A stop plate 156 abuts and positions the card on the stacking plate. The guard may be shifted out of the way as shown in phantom in Fig. 14. The usual glass guard plate 157 (Figs. 14 and 15) covers the top of the machine being swingably mounted on a hinge pin 158. When the cards are removed from the stacking plate, bell crank handle 155 may be actuated to disengage nut 151 from the threads 150, permitting the plate frame 154 to be freely slid to its uppermost position.

Referring to Fig. 19, showing the circuit diagram of the machine and assuming the switch S to be closed, the machine is started by depressing start key 159 to close contacts 160. This completes a circuit through normally closed contacts 161, line 92, line 93, line 94, magnet 162 and magnet 163. As magnet 162 is energized, it attracts its armature 164 which engages contact 165 to complete a circuit through line 166, the motor 13 and line 167. Motor 13 being set in motion the picker 26 feeds a card to the analyzing mechanism. The card in advancing engages a lever 168 to close the card lever contacts 169. As magnet 163 has been energized by closing the start key, its armature 170 has closed contacts 171 completing a circuit through the line 172 and the card lever contacts which circuit shunts the start key, whereby when the finger is taken off starting key 159, resulting in contacts 160 opening, the motor circuit remains closed and the motor continues to rotate. When there are no more cards, or the cards are not feeding due to an obstruction in their path, there will be no contact of the card with the lever 169 causing contacts 169 to open and opening the motor circuit to stop the motor. Stop key 173 may be depressed at will to open contacts 161 and stop the motor 13.

Briefly summarizing the operation of the machine, preliminary to setting the motor 13 in motion, the following adjustments are made: The analyzing brush 42 is first adjusted by means of handle 44 to position for sensing the desired card column. If the numerals or the letters A-L are to be sorted, adjustable projections 98 on the guide-opening pins 79 are then moved by means of handle 103 to the right as viewed in Fig. 9, while if the letters M-Z are to be sorted, the projections 98 are permitted to remain at the left, as viewed in said figure. Finally, the commutator disc 48 is adjusted to select either the upper or the lower field of the card. After these preliminary adjustments, the switch S (Fig. 19) being closed, and the record cards having been put into the supply magazine, the start key 159 is depressed setting the motor 13 in operation. The key 159 is held down until picker 26 feeds the first card from magazine A into engagement with lever 168 adjacent the magazine to thereby close card lever contacts 169 completing a holding circuit for the motor whereupon the key is released and so long as cards are being fed, the motor will continue to rotate. The card is fed by picker 26 into the bite of the first of a series of feed rolls 37 which feed the card beneath analyzing brush 42 in synchronism with the rotation of commutator disc 48 so that the first position of the card reaches the analyzing brush at the same time as the commutator brush 49 reaches the first fixed commutator contact 50. The occurrence of successive perforations in any positions of the card results in the analyzing brush engaging roll contact 46 at successive intervals completing the energizing circuit of the magnets M corresponding to the positions in which the perforations occur. Energization of the magnets M attracts their respective armatures 66 to disengage the desired combs 74 which cooperate with projections 85 and 98 on the guide-opening pins 79 (Fig. 12) to release a single pin corresponding to the character designated by the combination of perforations. The pin contacts its respective guide plate 88 providing an entrance for the card which is continuously advanced by the series of spaced rolls 37 till it falls into the sorting pocket 40 communicating with the opened guide. Those cards which are not sorted continue to advance to the reject station 41 where they stack up on the plate 137 from which they may be removed by the operator.

While I have shown and described and pointed out the fundamental novel features of the invention as applied to a single modification it will be understood that various omissions and substitutions and changes in the form and details of the device illustrated and in its operation may be made by those skilled in the art without departing from the spirit of the invention. I intend to be limited therefore only as indicated by the scope of the following claims.

What is claimed is:

1. A sorting machine for records bearing combinational index point designations, comprising an analyzing device for reading said records and means controlled by said device for separating only the records bearing any one of a group of designations, and means for adjusting said separating means to separate only those records bearing any one of a different group of designations.

2. A machine for sorting record cards bearing combinational index point designations, comprising an analyzing device, a plurality of guides for leading said cards to several destinations, guide actuating members, means for restraining movement of said guide actuating members, and means controlled by said analyzing device for releasing said restraining means to permit said members to open the guides in accordance with the designations.

3. A machine for sorting records bearing combinational index point designations, comprising guides for leading said cards to their several destinations, members for actuating said guides to open a passage for a record, elements for preventing movement of said members, an anlyzing device for searching said records, and means controlled by said analyzing device for normally preventing operation of said elements and releasable from said elements in accordance with an analysis of a designation.

4. A machine for sorting record cards bearing combinational index point designations comprising an analyzing device, a plurality of guides for leading said cards to their several destinations, members for controlling the opening of said guides, and magnetic devices controlled by said analyzing device for controlling said members, each of said magnetic devices including an armature normally latched to only one of said members and releasable to permit movement of said member.

5. In a sorting machine for sorting records bearing combinational index point designations, a plurality of guides for leading said records to their destinations, a plurality of guide openers for engaging said guides, control lugs provided on each of said guide openers and control members controlled by said analyzing device for effecting operation of said guide openers, said control members including control openings through which said control lugs may move.

6. A sorting machine for record cards having a plurality of designation fields each field comprising a plurality of columns and each column a plurality of index point positions, electrical analyzing means for successively searching the index point positions of successive columns of different fields, a distributing mechanism and magnetic controlling means therefor including a plurality of magnetic elements one being provided for each index point position of one column of one field, means to connect said magnetic elements with said analyzing means in accord with searching of successive index point positions of one field by said analyzing means and means to selectively adjust said connecting means to make it responsive to only one field of said record card.

7. A machine according to claim 6 wherein said connecting means comprises an adjustable contact disk moved in unison with the card feed and a plurality of stationary contact elements each being connected to one of said magnetic elements, said disk being adapted to coact with said contact elements in synchronism with the analysis of the index point positions.

8. A machine for sorting record cards bearing combinational index point designations, comprising an analyzing device, a plurality of guides for leading said cards to several destinations, guide actuating members, two sets of means for restraining movement of said guide actuating members, and means controlled by said analyzing device for releasing one set of said restraining means to release said members for opening the guides in accordance with the designations and means to selectively render inoperative said second set of means restraining movement of said guide actuating members for any one or a plurality of said last mentioned members.

9. A machine for sorting record cards bearing combinational index point designations comprising an analyzing device, a plurality of guides, a plurality of corresponding guide openers, each of said guide openers cooperating with a different combination of control members and means controlled by said analyzing device cooperating with said control members to effect operation of one of said guide openers and means cooperating with each guide opener to selectively prevent any of said guide openers from cooperating with the coordinated guides when released for opening operation.

10. In a sorting machine for record cards bearing combinational index point designations, analyzing means settable to a position for analyzing a particular field of the record cards, a translating mechanism controlled thereby, a distributing mechanism controlled for operation by said translating mechanism to sort the cards in accordance with the sensing of a particular combination of index points by said analyzing means, and means for adjusting said translating mechanism to selectively effect the same operation of said distributing mechanism under control of the analyzing means while the latter is still in the same aforesaid position in accordance with the sensing by said analyzing means of a different combination of index points.

11. In a sorting machine for record cards bearing combinational index point designations, analyzing means therefor, a translating device comprising a plurality of translating units one being provided for each index point position of the record, a plurality of station selectors for the records exceeding the number of index point positions of the record, said station selectors being under the control of said translating device, and means to selectively cause actuation of the same station selectors when different translating units are actuated upon analysis of different combinational index point designations.

12. In a sorting machine for record cards bearing combinational index point designations, means for analyzing the records while they are in motion, a translating mechanism controlled by said records, a distributing mechanism controlled by said translating mechanism to sort the cards in accordance with their designations and selective means to effect the same action of said distributing mechanism for different actuations of said translating mechanism.

13. In a sorting machine for record cards bearing combinational index point designations, means for successively analyzing the cards while in motion, a translating device comprising a plurality of translating units each being brought into cooperative relationship to said analyzing means in accordance with the passage of the coordinated index point position on said analyzing means, a plurality of station selectors for the records exceeding the number of index point positions of the record, said station selectors being under the control of said translating device and shiftable means to selectively cause actuation of the same station selectors upon actuation of different translating units by different designations.

14. A machine for sorting record cards bearing combinational index point designations, including an analzing device for searching said cards, a plurality of guides for leading said cards to several destinations, a plurality of guide openers for engaging said guides to open a path for a record card, a plurality of control members for said guide openers, and a plurality of magnetic devices controlled by said analyzing device and in turn controlling the operation of said members and selectively adjustable means to permit actuation of the same guide opener by said members upon analysis of different combinational index point designations.

15. A sorting machine for record cards having a plurality of designation fields each bearing index point designations, an analyzing device therefor, a station selecting mechanism for the records having a plurality of selectors under the control of said analyzing device, means to selectively adjust said station selecting mechanism to be responsive to analysis of only one of said designation fields, and means for selectively preventing said station selectors from being responsive to a particular designation in said selected field.

16. A sorting machine for record cards having a plurality of designation fields each bearing combinational index point designations, an analyzing device therefor, a station selecting mechanism for the records having a plurality of selectors which are under the control of said analyzing device, means for selectively adjusting said station selecting mechanism to be responsive to only one of said combinational index designation fields, and means for selectively rendering said station selectors operative or inoperative.

17. A sorting machine for record cards having a plurality of designation fields each bearing combinational index point designations, analyzing means for successively searching the different index point positions of the different fields, a translating device controlled by said analyzing means, said device comprising as many translating units as the maximum number of index point positions of one of said fields, means to adjust said translating device selectively to be responsive to one of said fields only while the cards are being analyzed, a plurality of station selectors controlled by said translating device, and means for selectively rendering said station selectors operative or inoperative when controlled by the translating device.

18. In a sorting machine for record cards bearing combinational index point designations, analyzing means therefor, a translating device controlled by said analyzing means and comprising a plurality of translating units one being provided for each index point position of the record, a plurality of record stations, selectors to direct the records to the stations said selectors being under the control of said translating device, and selective shifting means to cause the same station selectors to be actuated under control of different translating units when the latter are actuated upon analysis of different combinational index point designations and means for preventing operation of any of said station selectors under control of any of its cooperating translating units.

19. In a sorting machine for record cards having a plurality of designation fields each bearing combinational index point designations, analyzing means therefor, a translating device responsive to said analyzing means and selective means for rendering said translating device responsive to only one of said plurality of fields, station selecting members for the records under the control of said translating device, means to actuate the same station selecting member upon different actions of said translating device, and means to selectively render said station selecting member operative or inoperative to be controlled by said translating device.

20. In a sorting machine for record cards, an analyzing device for the records, a plurality of guide blades having entering portions terminating in longitudinal alinement and laterally staggered relative to each other, a plurality of selecting elements, one being associated with each guide blade, said selecting elements being controlled by said analyzing device to operate the associated guide blades.

21. In a sorting machine for record cards, an analyzing device for the records, a plurality of guide blades having narrowed entering portions terminating in longitudinal alinement and being laterally staggered relative to each other, a plurality of selecting elements arranged in lateral alinement similarly to said entering portions, each element being associated with each guide blade and adapted to engage the entering portion of its associated guide blade; and means controlled by said analyzing device to actuate any one of said selecting elements to engage the associated guide blade and permit the record card to be fed thereunder.

22. In a sorting machine for record cards having combinational index point designations, an analyzing device therefor, a plurality of controlling frames controlled by said analyzing device singly or in combination in accordance with the index point designations, a plurality of station selectors normally restrained by said controlling frames and one selector being released for action upon controlling operation of one or a plurality of said frames, means to restore the station selector and means to restore the actuated controlling frames so as to restrain the selector in its normal position by said frames.

23. In a sorting machine for record cards bearing combinational index point designations, an analyzing device therefor, a plurality of controlling frames restrained in normal position and being under releasable control of said analyzing device, a plurality of yieldingly mounted station selectors having projections coacting with said frames which normally restrain said selectors, one of said selectors being released for action upon actuation of one or a plurality of said frames under the control of the analyzing device, means to restore any actuated selector and means to move the released frames to their normal position so as to engage the projections of said selector and to restrain it in normal position.

24. In a machine according to claim 23 wherein said frames are provided with a slot, all selectors passing through the slot of each frame and being arranged in rectangular moving direction to said frames.

25. In a sorting machine for record cards bearing combinational index point designations, an analyzing device therefor, a plurality of controlling elements, controlled by said analyzing device in accordance with the index point designations, a plurality of station selectors being under the control of said controlling elements, each controlling element effecting a predetermined controlling effect upon coordinated selectors and auxiliary means controlled by a predetermined group of said controlling elements and adapted to coact with said selectors to change the controlling effect of the controlling elements of said group upon the selectors.

26. A machine according to claim 25 characterized thereby that said auxiliary means is only released for action when all controlling elements of said predetermined group of controlling elements are actuated whereas it is held inoperative by the remaining controlling elements when only a part of the group of said controlling elements is actuated.

27. A machine according to claim 25 characterized thereby that said auxiliary means comprises a frame having lugs which coact with two of the controlling elements which also comprise controlling frames, which lugs coact with both controlling frames and release the auxiliary frame for action only when both controlling frames have been actuated whereas the auxiliary frame is held in inoperative position by a non-actuated controlling frame.

28. In a machine operating on records having a pair of non-overlapping, spaced columns, each column having like positions arranged for bearing any of several designations which may be contained in the similar positions of the other column; means for sensing these columns of a record at different periods during a single run of the record through the machine, electrical devices adapted to be similarly operated in accordance with the designations of each field, electric circuits for controlling said devices, and means for selectively rendering the sensing means effective to control said circuits in accordance with the designations of only one of said columns.

29. In a machine operating on records having a pair of non-overlapping, spaced columns, each column having like positions correlated to each other to bear any of the designations adapted to be borne by the similar positions of the other column; means for sensing both columns of a record during a single run of the records through the machine, distributing mechanism for the records adapted to be similarly operated in accordance with designations of each field, means for controlling the distributing mechanism in accordance with the sensing of only one of the columns, and means for selectively determining which column is to exercise control.

30. In a machine operating on records having non-overlapping, vertically spaced columns, one column being completely below another, each column having a series of designation bearing positions which is a duplicate of the series of designation bearing positions of the other column; means for sensing duplicate positions of these columns successively during a single run of the records through the machine, distributing mechanism for the records operable similarly for designations borne by the positions of either column of a record, and means for controlling the mechanism to distribute the records in accordance with the sensing of either selected one of the columns.

31. In a machine for sorting records bearing items, means for analyzing the records, a plurality of receptacles for the records, means separate from the analyzing means and controlled by the latter for translating the analysis of the records and controlling the receptacles according to certain items, and means for varying the setting of the translating means independently of the analyzing means to control the receptacles according to different items.

32. In a machine for operating on a record having a pair of non-overlapping columns spaced relatively in the direction of length of a column, each column having similar designation bearing positions arranged for bearing any of several designations which may be contained in similar positions of the other column; the combination of an analyzer for searching the positions of the pair of columns for designations during a single run of the record through the machine, elements adapted to be given the same operation for a designation of one column as they are given by a duplicate designation of the other column, control connections between the analyzer and said elements, and a device for selectively rendering the analyzer effective to operate said elements through said connections in accordance with the designations of either and only a selected one of said pair of columns.

33. A machine for sorting record cards bearing combinational index point designations; comprising in combiantion a plurality of card stations, a card analyzer for reading the combinational designations, a plurality of combs operated under control of the analyzer in combinations dependent on the analysis, a plurality of members, interengaging control portions on said combs and said members, said interengaging portions being arranged for holding all the members stationary prior to aforesaid analyzer-controlled operation of the combs and designed after operation of the combs in any of their combinations to selectively release only one of said members for operation while the other members are still held inoperative by the interengaging portions, and guides to said pockets selectively positively engaged and operated by any one released member to guide the card to one of the pockets in accordance with the analyzed designation.

34. In a machine for sorting records bearing combinational index point designations; the combination of a plurality of card stations, a card analyzer for reading said designations, mechanism for opening a path for the cards to said stations in accordance with their designations, a translator between the analyzer and said mechanism cooperating with the latter for selectively controlling said mechanism, said translator including a plurality of control elements automatically operated to jointly and simultaneously coact with said mechanism to determine operation of the latter under control of the analyzer, said control elements being adjustable at will relative to the translator to vary their selection of the operation of said mechanism under control of the analyzer.

EUGENE A. FORD.